United States Patent
Liuzzo et al.

(10) Patent No.: US 11,630,889 B2
(45) Date of Patent: Apr. 18, 2023

(54) USER MONITORING AND ACCESS CONTROL BASED ON PHYSIOLOGICAL MEASUREMENTS

(71) Applicant: Bank of America Corporation, Charlotte, NC (US)

(72) Inventors: Elizabeth R. Liuzzo, Charlotte, NC (US); George Albero, Charlotte, NC (US); Edward Lee Traywick, Charlotte, NC (US); Elijah Clark, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 663 days.

(21) Appl. No.: 16/529,437

(22) Filed: Aug. 1, 2019

(65) Prior Publication Data

US 2021/0034727 A1 Feb. 4, 2021

(51) Int. Cl.
  *G06F 21/32* (2013.01)
  *G06F 21/62* (2013.01)
  *G06V 40/70* (2022.01)
  *G06V 40/10* (2022.01)

(52) U.S. Cl.
  CPC .............. *G06F 21/32* (2013.01); *G06F 21/62* (2013.01); *G06V 40/70* (2022.01); *G06V 40/15* (2022.01)

(58) Field of Classification Search
  CPC ........ G06F 21/32; G06F 21/62; G06F 21/316; G06V 40/70; G06V 40/15; G06V 40/10
  See application file for complete search history.

(56) References Cited

U.S. PATENT DOCUMENTS

| | | | |
|---|---|---|---|
| 8,272,053 B2 | 9/2012 | Markham et al. | |
| 8,607,340 B2 | 12/2013 | Wright | |
| 8,793,790 B2 | 7/2014 | Khurana et al. | |
| 8,887,300 B1 * | 11/2014 | Gates | H04L 63/10 |
| | | | 713/168 |
| 9,047,464 B2 | 6/2015 | Sambamurthy et al. | |
| 9,092,605 B2 | 7/2015 | Sambamurthy et al. | |
| 9,111,088 B2 | 8/2015 | Ghai et al. | |
| 9,118,702 B2 | 8/2015 | MaCaulay | |
| 9,280,661 B2 | 3/2016 | Adjaoute | |
| 9,367,694 B2 | 6/2016 | Eck et al. | |
| 9,648,039 B1 | 5/2017 | Lipinski et al. | |
| 9,652,597 B2 | 5/2017 | Roundy et al. | |
| 10,027,711 B2 | 7/2018 | Gill et al. | |
| 2010/0083055 A1 * | 4/2010 | Ozonat | G06F 11/3447 |
| | | | 714/E11.179 |

(Continued)

FOREIGN PATENT DOCUMENTS

WO  WO-2020259818 A1 * 12/2020

*Primary Examiner* — Han Yang
(74) *Attorney, Agent, or Firm* — Banner & Witcoff, Ltd.

(57) ABSTRACT

Aspects of the disclosure relate to physiological sensor-based monitoring and control systems. A computing device may determine a physiological measurement. Then, the computing device may compare the physiological measurement with one or more baseline values to determine whether the physiological measurement is anomalous with respect to the one or more baseline values. When the physiological measurement is determined to be anomalous with respect to the one or more baseline values, the computing device may execute access control on a device to prevent access by a user to one or more systems, applications, resources, or the like.

20 Claims, 8 Drawing Sheets

(56) References Cited

U.S. PATENT DOCUMENTS

| | | | |
|---|---|---|---|
| 2012/0019559 A1* | 1/2012 | Siler | G16H 40/63 345/440 |
| 2014/0282965 A1* | 9/2014 | Sambamurthy | G06F 21/32 726/7 |
| 2015/0028996 A1* | 1/2015 | Agrafioti | A61B 5/318 340/5.82 |
| 2016/0063227 A1* | 3/2016 | Kobres | H04L 63/08 726/3 |
| 2016/0094898 A1* | 3/2016 | Primm | H04Q 9/00 340/870.09 |
| 2016/0330217 A1* | 11/2016 | Gates | H04L 63/1441 |
| 2017/0214701 A1 | 7/2017 | Hasan | |
| 2019/0121972 A1 | 4/2019 | Norvill et al. | |
| 2019/0220583 A1* | 7/2019 | Douglas | G06V 40/70 |

\* cited by examiner

| User Identity 304 | Physiological Model 308 | Baseline Value(s) 312 | Access Control Settings 316 | Status 320 |
|---|---|---|---|---|
| User A | | | | |
| User B | | | | |
| ⋮ | ⋮ | ⋮ | ⋮ | ⋮ |
| ⋮ | ⋮ | ⋮ | ⋮ | ⋮ |

USER MONITORING AND ACCESS CONTROL BASED ON PHYSIOLOGICAL MEASUREMENTS

FIELD

Aspects described herein generally relate to computer systems, networks, and user access thereto. More specifically, aspects of this disclosure relate to use of physiological sensor systems for enhancing computer and data security.

BACKGROUND

Ubiquitous availability of biometric sensors has enabled development of various security and access control systems. However, simple biometric identification (such as fingerprint recognition, or the like) may not provide complete security in all circumstances. An enterprise, for example, may often wish to secure its networks and sensitive data from potential misuse, by employees or other internal users, who may otherwise be authorized for access to its networks and/or devices.

SUMMARY

Aspects of the disclosure provide effective, flexible, and user-customized solutions that address and overcome technical problems associated with securing networked systems. In particular, one or more aspects of the disclosure relate to sensor-based monitoring that is integrated with access control systems and notification mechanisms, for detection of potential threats and execution of remedial steps.

In accordance with one or more arrangements, a computing platform having at least one processor, a communication interface, and memory may determine, using a physiological sensor, a first physiological measurement. Then, the computing platform may determine if the first physiological measurement is anomalous with respect to one or more baseline values. The computing platform may execute access control on a first device when the computing platform determines that the first physiological measurement is anomalous with respect to the one or more baseline values. Executing the access control on the first device may comprise transmitting, via the communication interface, data to execute the access control on the first device.

In some arrangements, the computing platform may determine, using a second physiological sensor, a second physiological measurement. The computing platform may determine, using the first measurement and the second measurement, a physiological score. Determining if the first physiological measurement is anomalous with respect to the one or more baseline values may comprise determining if the physiological score is anomalous with respect to the one or more baseline values.

In some arrangements, the first physiological sensor may measure a first physiological parameter, and the second physiological sensor may measure a second physiological parameter, where the second physiological parameter may be different from the first physiological parameter.

In some arrangements, the one or more baseline values may be one or more first baseline values. The computing platform may determine, using a second physiological sensor, a second physiological measurement. Thereafter, the computing platform may determine if the second physiological cal measurement is anomalous with respect to one or more second baseline values. Executing access control on the first device may comprise executing the access control when the second physiological measurement is determined to be anomalous with respect to the one or more second baseline values.

In some arrangements, the data further comprises an identification of the first device and an indication of an access control restriction to be executed on the first device.

In some arrangements, the data to execute the access control is transmitted to the first device.

In some arrangements, executing the access control may comprise one or more of: restricting operations of a software operating on the first device; restricting access, of the first device, to a communication network; restricting access, of the first device, to a database; restricting access, of the first device, to a peripheral device; and implementing additional controls on at least one of: data outbound from the first device, and data inbound to the first device.

In some arrangements, the data is transmitted to a second device that is different from the first device.

In some arrangements, executing the access control may comprise one or more of: restricting access of the first device to transmit data to and/or receive data from the second device; restricting access to a software application, operating on the second device, by the first device; and restricting access to a database communicatively coupled to the second device, from the first device.

In some arrangements, determining if the first physiological measurement is anomalous with respect to the one or more baseline values may comprise, one of: determining if the first physiological measurement is lower than a first baseline value, and if the first physiological measurement is lower than a second baseline value, where the first baseline value is lower than the second baseline value; determining if the first physiological measurement is higher than a third baseline value, and if the first physiological measurement is higher than a fourth baseline value, where the third baseline value is higher than the fourth baseline value; or determining if the physiological measurement is outside a first range of baseline values, and if the physiological measurement is outside a second range of baseline values, where the first range of baseline values is different from the second range of baseline values.

In some arrangements, executing access control on the first device may comprise: executing a first set of access controls if the computing platform determines that the first physiological measurement is higher than the fourth baseline value and not higher than the third baseline value, and executing a second set of access controls if the computing platform determines that the physiological measurement is higher than the third baseline value.

In some arrangements, the computing platform may determine, using one or more physiological sensors, a plurality of baseline physiological measurements. Then, the computing platform may determine the one or more baseline values based on the plurality of physiological measurements. Thereafter, the computing platform may store the one or more baseline values in the memory.

In some arrangements, the physiological sensor is one of: a skin conductance sensor, or an image sensor.

In some arrangements, the computing platform may generate an access control notification. The access control notification may comprise one or more of: an indication of the first device, a physiological parameter corresponding to the first physiological measurement, and the access control executed on the first device. The computing platform may transmit the access control notification to a second device.

BRIEF DESCRIPTION OF THE DRAWINGS

The present disclosure is illustrated by way of example and not limited in the accompanying figures in which like reference numerals indicate similar elements and in which:

FIG. 3 shows an example look-up table for use in user monitoring and access control, in accordance with one or more example embodiments;

DETAILED DESCRIPTION

Figure 1A:
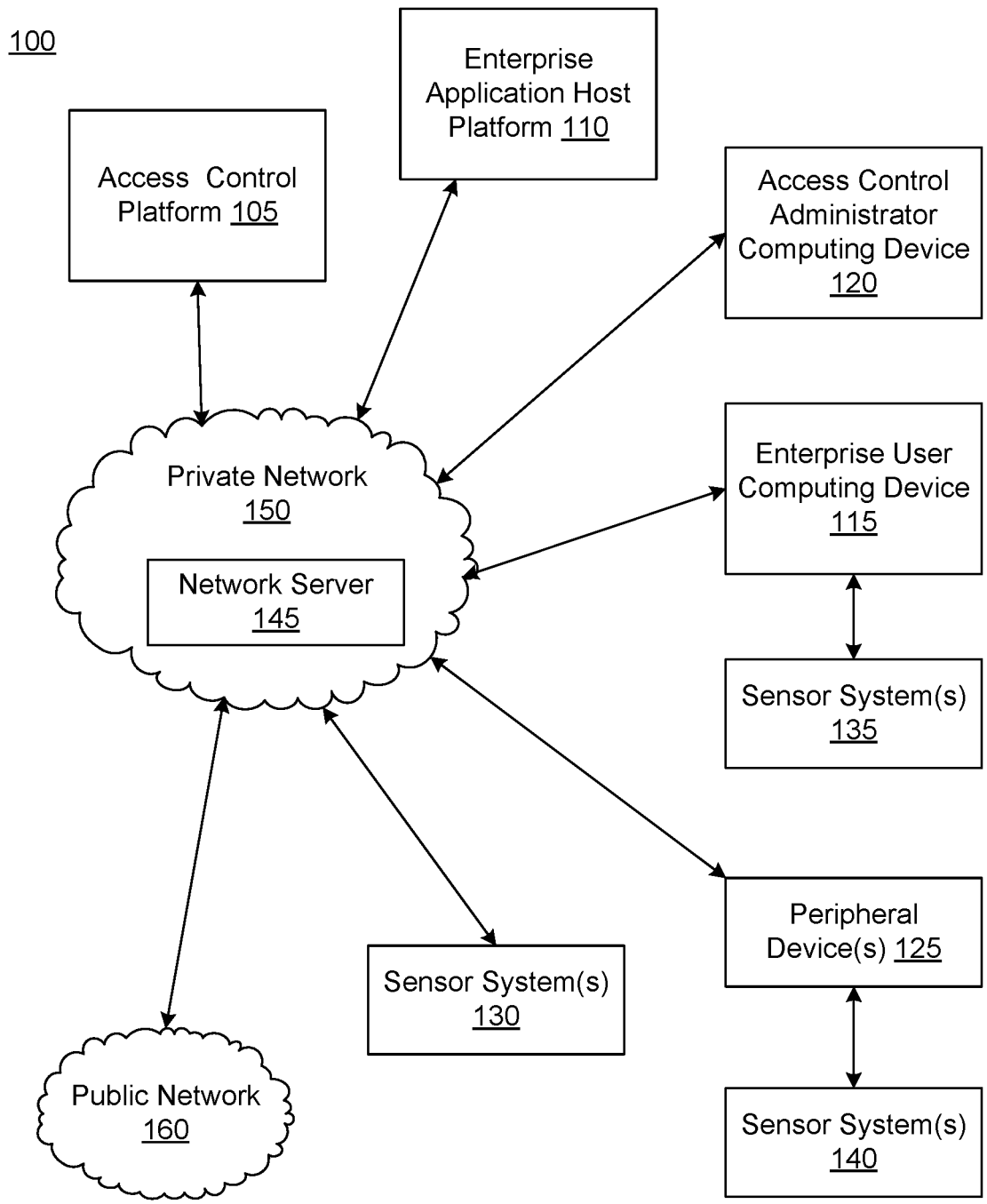
FIGS. 1A and 1B show an illustrative computing environment for sensor-based user monitoring and access control systems, in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for providing enhanced security to sensitive data and communication networks. Analyzing behavioral patterns and associated emotional states may be a tool to predict potential malicious activity. Physiological measurements may reflect emotional states, and quantitative and qualitative analysis of such measurements may provide predictors for potential risks to sensitive data, information, and security. The physiological measurements may correspond, for example, to measures of various bodily functions (e.g., functions of major organ systems). The physiological measurements may be correlated, for example, to a level of emotional arousal, valence, and/or aspects related to mental state and/or emotional state of a subject (e.g., anger, anxiety, fear). Networking one or more sensors for physiological measurements with access control systems may provide near real-time detection and responses to potential threats.

An enterprise may seek to secure its data and networks from potential misuse by those otherwise authorized to access the enterprise's private networks and/or databases. Some aspects of this disclosure relate to the use of sensors to monitor and measure various physiological parameters of one or more users. A sensor system and/or an access control platform may develop separate models (e.g., physiological models) corresponding to individual users, based on one or more such measurements. Baseline characteristics (e.g., baseline values corresponding to one or more measured physiological parameters), obtained based on the developed models, may be used to determine any deviations in future measurements. Deviations in measurements may be correlated to various emotional states of the users. Access controls may be executed based on the detected deviations. Different levels of access control may be used based on an amount of a detected deviation from a baseline value. Use of individualized and updated models and/or baseline values may result in a more secure networking environment by allowing rapid detection of possible threats and automatic implementation of access controls based on the results of the physiological analysis.

Access controls may be implemented, for example, to protect sensitive data of clients (e.g., users availing services provided by an enterprise organization) corresponding to the enterprise organization. Types of measurements, physiological sensors used, and levels of access control may be implemented, based on knowledge and authorization of employees of the enterprise organization, to secure sensitive information of the enterprise organization and/or its clients.

Figure 1B:
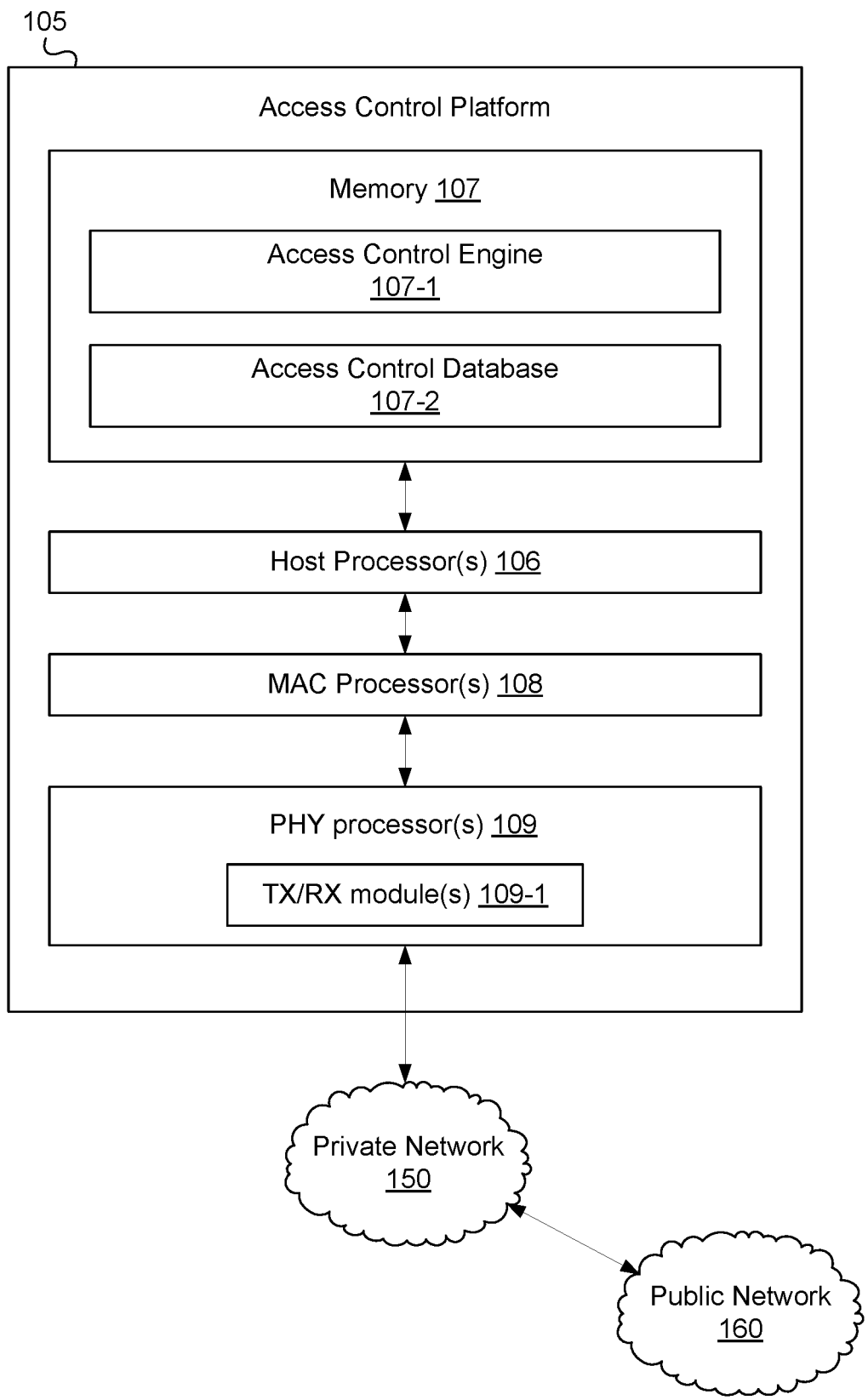

FIGS. 1A and 1B depict an illustrative computing environment for sensor-based user monitoring and access control systems, in accordance with one or more example embodiments. Referring to FIG. 1A, a computing environment 100 may comprise one or more devices (e.g., computer systems, communication devices, access control systems, and/or networked sensors). The computing environment 100 may comprise, for example, an access control platform 105, an enterprise application host platform 110, an enterprise user computing device 115, an access control administrator computing device 120, peripheral device(s) 125, sensor system(s) (e.g., sensor system(s) 130, 135, 140), and/or a network server 145. One or more devices, systems, and/or sensors may be linked over communication networks such as a private network 150 and a public network 160. The communication networks may use wired and/or wireless communication protocols.

A user in a context of the computing environment 100 may, for example, be an associated user (e.g., an employee, an affiliate, or the like) of an enterprise organization operating/associated with the private network 150. An external user (e.g., a client) may avail services being provided by the enterprise organization, and access one or more resources located within the private network 150 (e.g., through the public network 160). Users may operate one or more devices in the computing environment 100 to send messages to and/or receive messages to one or more other devices connected to the computing environment 100. An enterprise organization may correspond to any government or private institution, an educational institution, a financial institution, health services provider, retailer, or the like.

As illustrated in greater detail below, the access control platform 105 may comprise one or more computing devices configured to perform one or more of the functions described herein. The access control platform 105 may comprise, for example, one or more computers (e.g., laptop computers, desktop computers, servers, server blades, or the like).

The enterprise application host platform 110 may comprise one or more computing devices and/or other computer components (e.g., processors, memories, communication interfaces). The enterprise application host platform 110 may be configured to host, execute, and/or otherwise provide one or more enterprise applications. The enterprise application host platform 110 may be configured, for example, to host, execute, and/or otherwise provide one or more transaction processing programs, user servicing programs, and/or other programs associated with an enterprise organization. The enterprise application host platform 110 may be configured to provide various enterprise and/or back-office computing functions for an enterprise organization. The enterprise application host platform 110 may comprise various servers and/or databases that store and/or otherwise maintain account information, such as financial/membership account information including account balances, transaction history, account owner information, and/or other information corresponding to one or more users (e.g., external users). The enterprise application host platform 110 may process and/or otherwise execute transactions on specific accounts based on commands and/or other information received from other computer systems comprising the computing environment 100. The enterprise application host platform 110 may receive data from the access control platform 105, manipulate and/or otherwise process such data, and/or return processed data and/or other data to the access control platform 105 and/or to other computer systems in the computing environment 100.

The enterprise user computing device 115 may be a personal computing device (e.g., desktop computer, laptop computer) or mobile computing device (e.g., smartphone, tablet). The enterprise user computing device 115 may be linked to and/or operated by a specific enterprise user (who may, e.g., be an employee or other affiliate of an enterprise organization).

The access control administrator computing device 120 may be a personal computing device (e.g., desktop computer, laptop computer) or mobile computing device (e.g., smartphone, tablet). The access control administrator computing device 120 may be linked to and/or operated by an administrative user (who may, e.g., be a network administrator of an enterprise organization). The access control administrator computing device 120 may receive data from the access control platform 105, manipulate and/or otherwise process such data, and/or return processed data and/or other data to the access control platform 105 and/or to other computer systems in the computing environment 100. The access control administrator computing device 120 may be configured to control operation of the access control platform 105.

The peripheral device 125 may be a printer, data storage drive, camera, scanner, fax machine, or the like, or any other input/output device/interface. The peripheral device 125 may be configured to communicate over the private network 150 to generate an output (e.g., a printed document) based on received data, or to receive an input (e.g., a video from a camera) and transmit the input (e.g., a) over the private network 150.

The sensor system(s) 130, 135, and 140 may comprise sensing systems for measurements corresponding to one or more physiological parameters. The sensor system(s) 130, 135, and 140 may be used for the measurements of physiological parameters corresponding to a user of a device in the private network 150 (e.g., the enterprise user computing device 115, the peripheral device(s) 125, or the like), process the measurements, and transmit processed data to other devices within the computing environment 100. The sensor system(s) may further include processors, memories, TX/RX module(s), or the like, to measure, process and transmit the data to other devices within the computing environment 100. Physiological parameters may correspond to one or more of skin conductance, iris dilation, facial actions, and/or the like. One or more of the sensor system(s) 130, 135, and 140 may correspond to skin conductance sensing systems, pupil dilation measurement systems, eye tracking systems, facial action coding systems (FACS), sound recording systems, and/or other physiological measurements systems, and the like. The sensors system(s) 130, 135, and/or 140 may comprise iris scanners, cameras (visible light, infrared, or the like), microphones, and/or electrodes, or the like. A physiological measurement may correspond to a measure of a physiological parameter and/or a combination of measures of one or more physiological parameters.

Skin conductance sensors may measure a galvanic skin response (GSR). The skin conductance sensors may measure sweat gland activity in, for example, palms or fingers of a user. The skin conductance sensors may, for example, comprise electrodes for measurement of skin conductance. Higher levels of sweat gland activity may be generally associated with, for example, higher levels of emotional arousal and stress. Pupil dilation measurement systems, eye tracking systems, and FACS may comprise optical sensors (e.g., iris scanners, cameras, and/or the like). Larger pupil diameter may be generally associated with higher levels of emotional arousal. FACS may be used to monitor facial movements expressions of a subject and correlate the expressions to emotional valence. Voice data received from microphones may be processed to determine emotional arousal and/or emotional valence.

The sensor system(s) 135 may be communicatively coupled with the enterprise user computing device 115. The sensor system(s) 135 may optionally be used to authenticate an identity of a user. The sensor system(s) 140 may be communicatively coupled with the peripheral device(s) 125. The enterprise user computing system 115 and the peripheral device(s) 125 may be communicatively coupled with the sensor system(s) 135 and the sensor system(s) 140, respectively, over International Institute of Electrical and Electronics Engineers (IEEE) Standard 802.15.1 ("Bluetooth"), IEEE Standard 802.11 ("Wi-Fi"), and/or near-field communication (NFC) links, or the like. The sensor system(s) 130, 135, and/or 140 may be non-intrusively integrated into one or more other devices in the computing environment 100. Electrodes of a skin conductance sensor, transmitters/monitors, for example, may be integrated into a mouse, a keyboard, and/or a fingerprint scanner corresponding to the enterprise user computing device 115. Cameras for eye tracking systems, pupil dilation measurement systems, and FACS, for example, may be integrated into a computer monitor corresponding to the enterprise user computing device 115.

One or more devices in the private network 150 may use one or more measurements corresponding to different physiological parameters (e.g., facial actions, skin conductance, pupil diameter, eye movements, or the like) measured and processed by the one or more sensor system(s) 130, 135, and 140 to generate models (e.g., physiological models) that are tailored to individual users within the private network 150. A generated model for an individual user may comprise multiple measurements corresponding to the user. The one or more devices in the private network 150 may, based on the generated model for the user, determine baseline values (or ranges of baseline values) for various measured parameters corresponding to the user. A baseline value may also comprise a combination of two or more measured parameters, or may be determined using two or more measured parameters. Deviations in measurements, from the determined baseline values, may be correlated to emotional states of the individual user operating a device in the private network 150 (e.g., the enterprise user computing device 115, the peripheral device(s) 125, or the like). In one or more arrangements, the access control platform 105 may generate the model and the baseline values, and use the generated model and/or baseline values to detect any deviations in future measurements obtained by the sensor system(s) 130, 135, and 140. In one or more arrangements, the sensor system(s) 130, 135, and 140 may generate the model and/or the baseline values, and use the generated model to detect any deviations in measurements obtained by the sensor system(s) 130, 135, and 140.

The network server 145 may perform one or more functions corresponding to maintaining connectivity and controlling access to resources within the private network 150. The network server 145 may be, for example, a gateway to the public network 160, for devices connected to the private network 150. The network server 145 may enforce controls on one or more devices in the private network 150, e.g., the enterprise user computing device 115 and the peripheral devices 125. The network server 145 may, for example, control access, by the enterprise user computing device 115, to the peripheral device 115, and/or to the public network 160. In various arrangements, one or more other devices (e.g., the access control platform 105, the enterprise host platform 110, and/or the access control administrator computing device 120) may, alone or in combination, perform one or more functions of the network server 145.

The computing environment 100 may also comprise one or more networks (e.g., public networks and/or private networks), which may interconnect one or more of the access control platform 105, the enterprise application host platform 110, the enterprise user computing device 115, the access control administrator computing device 120, the peripheral device(s) 125, and/or the sensor system(s) 130, 135, and 145. The computing environment 100 may comprise the private network 150 (which may, e.g., interconnect the access control platform 105, the enterprise application host platform 110, the enterprise user computing device 115, the access control administrator computing device 120, the peripheral device(s) 125, the sensor system(s) 130, 135, and 140, and/or one or more other systems which may be associated with an enterprise organization, such as a financial institution, a service provider, a government or a private enterprise, a health institution, an educational institution, or the like) and the public network 160. The private network 150 may, for example, correspond to a local area network (LAN), a wide area network (WAN), a peer-to-peer network, or the like.

The access control platform 105, the enterprise application host platform 110, the enterprise user computing device 115, the access control administrator computing device 120, the peripheral device(s) 125, the sensor system(s) 130, 135, and/or 140, and/or one or more other systems/devices in the computing environment 100 may be any type of computing device capable of receiving input via a user interface, and communicating the received input to one or more other computing devices. The access control platform 105, the enterprise application host platform 110, the enterprise user computing device 115, the access control administrator computing device 120, and/or the other systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the access control platform 105, the enterprise application host platform 110, the enterprise user computing device 115, the access control administrator computing device 120, the peripheral device(s) 125, the sensor system(s) 130, 135, and 140, and/or other systems in the computing environment 100 may, in some instances, be special-purpose computing devices configured to perform specific functions.

Referring to FIG. 1B, the access control platform 105 may comprise one or more of host processor(s) 106, memory 107, medium access control (MAC) processor(s) 108, physical layer (PHY) processor(s) 109, transmit/receive (TX/RX) module(s) 109-1, or the like. One or more data buses may interconnect host processor(s) 106, memory 107, MAC processor(s) 108, PHY processor(s) 109, and/or Tx/Rx module(s) 109-1. The access control platform 105 may be implemented using one or more integrated circuits (ICs), software, or a combination thereof, configured to operate as discussed below. The host processor(s) 106, the MAC processor(s) 108, and the PHY processor(s) 109 may be implemented, at least partially, on a single IC or multiple ICs. Memory 107 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 108 and/or the PHY processor(s) 109 of the access control platform 105 are configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the TX/RX module(s) 109-1 over the private network 150 and/or the public network 160. Similarly, the PHY processor(s) 109 may receive PHY data units from the TX/RX module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

One or more processors (e.g., the host processor(s) 106, the MAC processor(s) 108, the PHY processor(s) 109, and/or the like) of the access control platform 105 are configured to execute machine readable instructions stored in memory 107. Memory 107 may comprise (i) one or more program modules/engines having instructions that when executed by the one or more processors cause the access control platform 105 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the access control platform 105 and/or by different computing devices that may form and/or otherwise make up the access control platform 105. For example, memory 107 may have, store, and/or comprise an access control engine 107-1, and an access control database 107-2. The access control engine 107-1 may have instructions that direct and/or cause the access control platform 105 to perform one or more operations, as discussed in greater detail below. The access control database 107-2 may store user information corresponding to users operating within the computing environment 100. The access control database 107-2 may, for example, store information corresponding to one or more generated models and/or baseline values(s) corresponding to physiological measurements. The baseline value(s) stored in the access control database 107-2 may be utilized by the host processor(s) 106 to compare physiological measurements, and to generate messages to execute various access controls, as discussed in greater detail below.

While FIG. 1A illustrates the access control platform 105 as being separate from other elements connected in private network 150, in one or more other arrangements, the access control platform 105 may be included in one or more of the enterprise application host platform 110, the enterprise user computing device 115, and the access control administrator computing device 120. Elements in the access control platform 105 (e.g., host processor(s) 105, memory(s) 107, MAC processor(s) 108, PHY processor(s) 109, and TX/RX module(s) 111, one or more program modules and/or stored in memory(s) 107) may share hardware and software elements with and corresponding to, for example, one or more of the enterprise application host platform 110, the enterprise user computing device 115, and/or the access control administrator computing device 120.

Figure 2A:
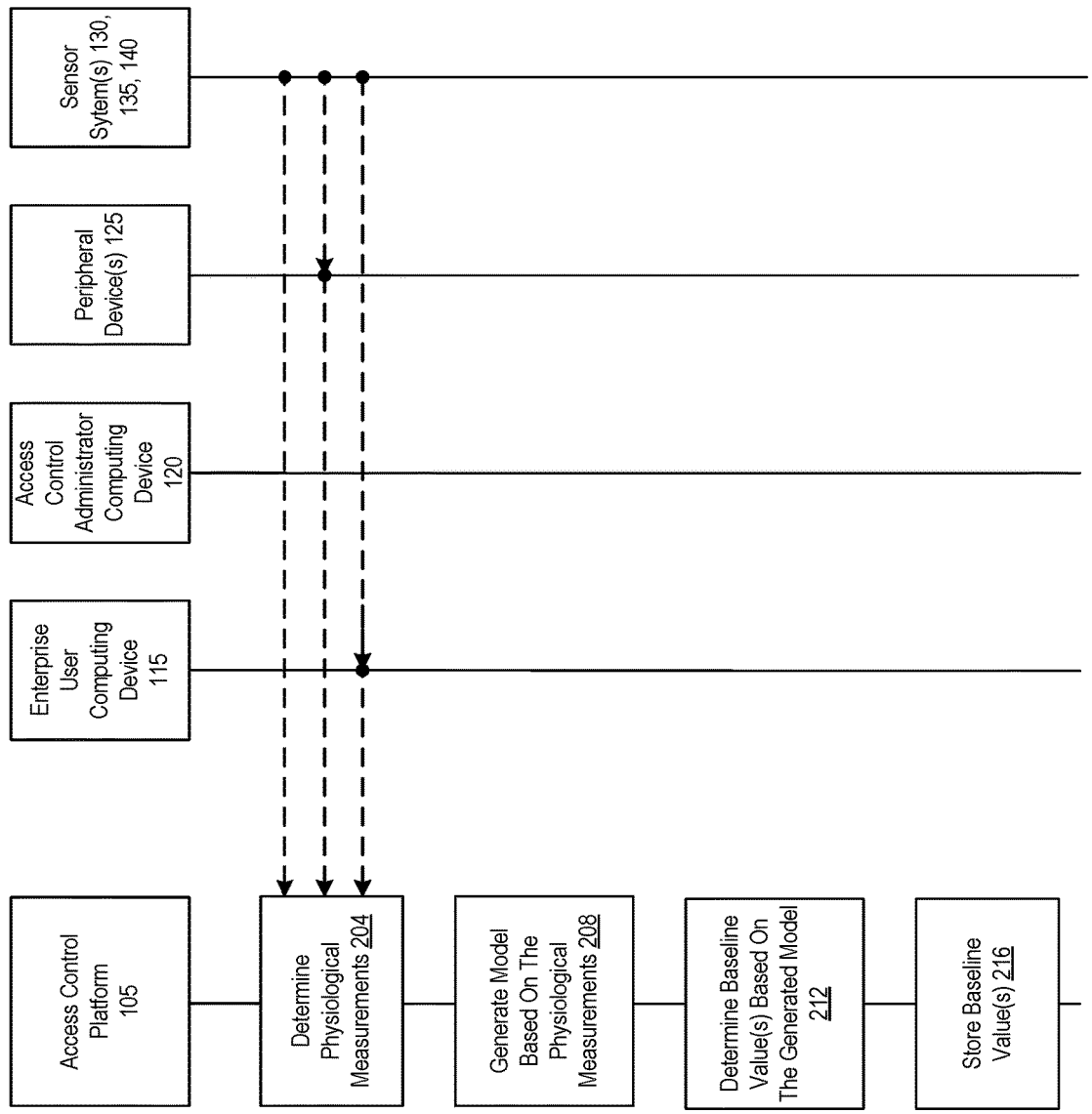
FIGS. 2A, 2B, and 2C show an illustrative event sequence for sensor-based user monitoring and access control systems, in accordance with one or more example embodiments.
Figure 2B:
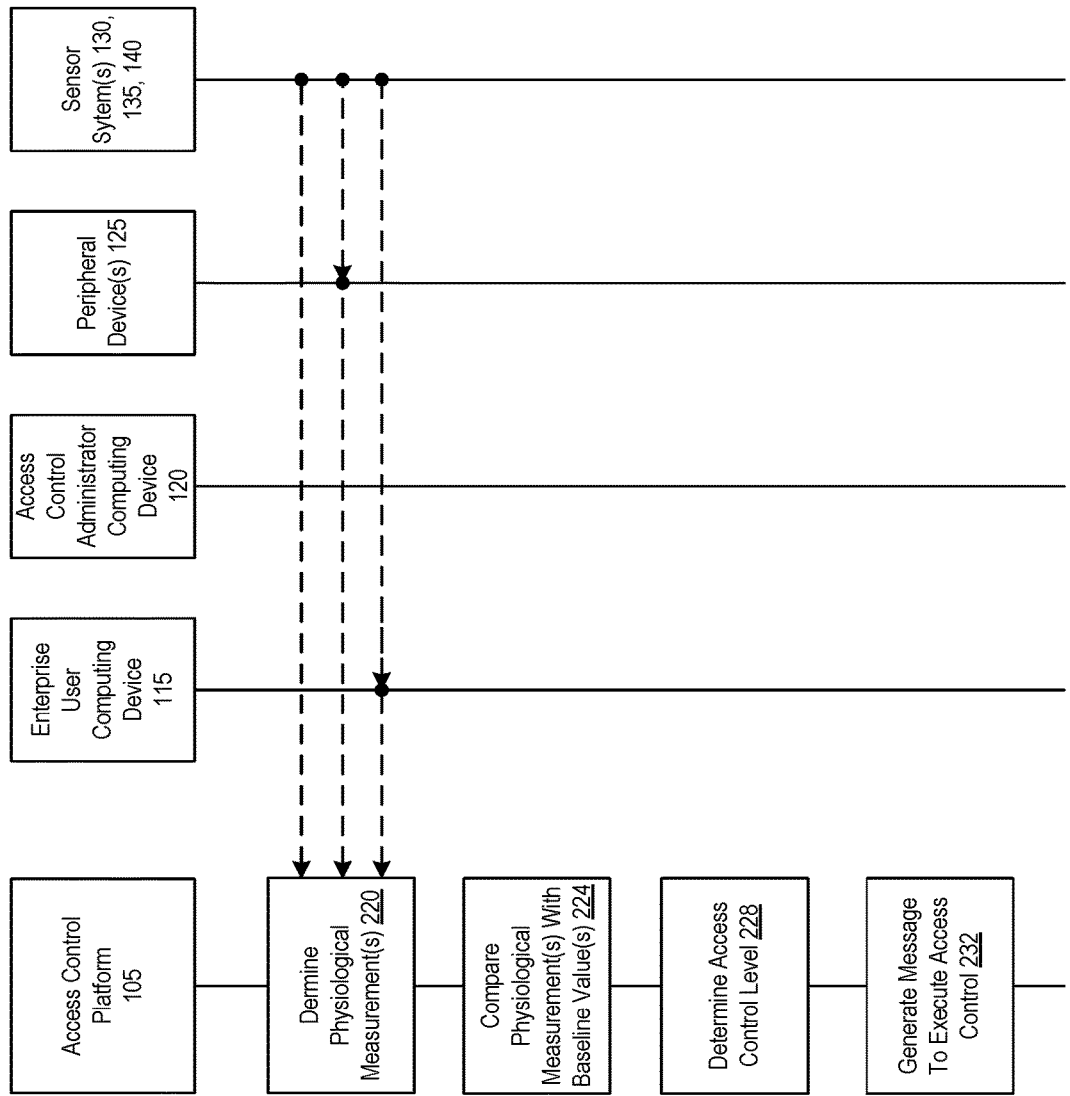

FIGS. 2A and 2B depict an illustrative event sequence for sensor-based user monitoring and access control, in accordance with one or more example embodiments. The illustrative event sequence is described with reference to the computing environment 100 merely as an example. In other embodiments, the illustrative event sequence occurs in a computing environment different from the computing environment 100.

Referring to FIG. 2A, at step 204, the access control platform 105 may determine physiological measurement(s) corresponding to the user from one or more of the sensor system(s) 130, 135 and 140. The access control platform 105 may determine the physiological measurement(s), corresponding to one or more physiological parameter(s) (e.g., facial actions, skin conductance, pupil diameter, eye movements, or the like), as measured by one or more sensors. The sensor system(s) 130, 135, and/or 140 may, for example, determine and transmit measurements corresponding to one or more physiological parameter(s) to the access control platform 105. Additionally, or alternatively, the sensor system(s) 135 may transmit one or more measurement(s) to the enterprise user computing device 115, which may then forward the measurement(s) to the access control platform 105. Additionally, or alternatively, the sensor system(s) 140 may transmit one or more measurement(s) to the peripheral devices(s) 125, which may then forward the measurements to the access control platform 105. The sensor system(s) 130, 135, and/or 140 may measure the physiological parameter(s) if the user is attempting access to and/or during a usage of one or more of the private network 150, the enterprise user computing device 115, the peripheral device(s) 125, and the like. The physiological measurement(s) may, for example, correspond to different instances of time, types of physiological measurements, measurement points, locations, and/or the like.

At step 208, the access control platform 105 may generate a model based on physiological measurements corresponding to the user, as received at step 204. The generated mathematical model may comprise, for example, multiple data points corresponding to the physiological measurements as determined at step 204. The access control platform 105 may generate, for example, a mathematical model that characterizes the physiological measurements corresponding to one or more physiological parameters. The mathematical model may comprise, for example, one or more average values, moving average values, weighted average values, root mean square values, standard deviation values, or the like, corresponding to the physiological measurements.

A model based on physiological measurements corresponding to the user may give more weightage to recent physiological measurements as compared to older physiological measurements. The model may, for example, determine a weighted average value of the physiological measurements, with more recent measurements being assigned higher weights. Weighing the model in favor of more recent measurements may enable the model to flexibly accommodate natural long-term variations in physiological characteristics of the user.

Generating the model may further comprise storing the model (e.g., one or more parameters defining the model) in a database. The access control platform 105 may, for example, store the model in the user monitoring database 107-2. The model may be stored using a lookup table in an entry corresponding to the user.

At step 212, the access control platform 105 may determine baseline value(s) corresponding to one or more physiological parameter(s). The access control platform 105 may determine the baseline value(s) based on, for example, based on the model as determined at step 208 and/or the physiological measurement(s) as determined at step 204.

Baseline value(s) may correspond to, for example, average value(s), moving average value(s), and/or weighted average value(s) of physiological measurements. Determining baseline value(s) may comprise, for example, determining threshold value(s) corresponding to physiological measurements. Threshold values may comprise a first threshold value, a second threshold value, and a third threshold value. In an example, the second threshold value may be greater than the first threshold value, and the third threshold value may be greater than a second threshold value. In an example, the second threshold value may be smaller than the first threshold value, and the third threshold value may be smaller than a second threshold value. In an example, determining baseline value(s) may comprise determining a different number of threshold values (e.g., one, two, four, or the like). The access control platform 105 may determine threshold value(s) based on an average value corresponding to the physiological measurements and/or a standard deviation corresponding to the physiological measurements.

Determining baseline value(s) corresponding to a physiological parameter may comprise determining one or more ranges of baseline values corresponding to the physiological parameter. A range of baseline values may be, for example, a range that is centered around an average value/moving average value/weighted average value of physiological measurements corresponding to the physiological parameter. One or more ranges of baseline values $y_a$, corresponding to a physiological parameter, may defined as $y_a = (\bar{x} - a \cdot SD, \bar{x} + a \cdot SD)$, wherein $\bar{x}$ is an average value of physiological measurements corresponding to the physiological parameter, and SD is a standard deviation of the physiological measurements corresponding to the physiological parameter. In one or more examples, $\bar{x}$ may be a moving average or a weighted average value of the physiological measurements corresponding to the physiological parameter. The value of a may be varied (e.g., a may be equal to 0.5, 1, 2, or the like) to obtain different ranges of baseline values. In other arrangements, baseline value(s) may be obtained using other techniques.

At step 216, the access control platform 105 may store baseline value(s) (e.g., as determined at step 212). The access control platform 105 may store the baseline value(s) in the access control database 107-2. The baseline value(s) may be stored in an entry corresponding to the user.

Referring to FIG. 2B, at step 220, (e.g., after baseline value(s) are determined) the access control platform 105 may determine physiological measurement(s) corresponding to the user from one or more of the sensor system(s) 130, 135 and 140. The access control platform 105 may determine physiological measurement(s) using one or more techniques as described with reference to step 204. A physiological measurement may be, for example, an average of a few samples (e.g., 5, 10, 20, or the like). Physiological measurements as determined at step 220 may be used to update a model (e.g., the model as generated at step 208). This may enable the system to accommodate long term variations in physiological parameters corresponding to a user.

At step 224, the access control platform 105 may compare physiological measurement(s) (e.g., the physiological measurement(s) as determined at step 220) with corresponding baseline values(s) (e.g., the baseline values(s) as determined in step 212). The access control platform 105 may determine if the physiological measurement(s) exceed the corresponding baseline value(s). The access control platform 105 may determine if the received physiological measurement(s) are lower than the baseline value(s). The access control platform 105 may determine if the received physiological measurement(s) are outside corresponding range(s) of baseline value(s).

The access control platform 105 may, for example, compare a physiological measurement corresponding to a physiological parameter with one or more threshold values corresponding to the physiological parameter. The access control platform 105 may determine, for example, if the physiological measurement is greater than a threshold. The access control platform 105 may, for example, determine if the physiological measurement is greater than a first threshold, greater than a second threshold, greater than a third threshold, or the like. In an example, the first threshold is lower than the second threshold, and the second threshold is lower than a third threshold. The access control platform 105 may use, for example, a different number of thresholds (e.g., one, two, four, or the like).

The access control platform 105 may determine, for example, if the physiological measurement corresponding to a physiological parameter is lower than a threshold corresponding to a physiological parameter. The access control platform 105 may, for example, determine if the physiological measurement is lower than a first threshold, lower than a second threshold, lower than a third threshold, or the like. In an example, the first threshold is greater than the second threshold, and the second threshold is greater than a third threshold. The access control platform 105 may use, for example, a different number of thresholds (e.g., one, two, four, or the like).

The access control platform 105 may, for example, determine a difference between a physiological measurement corresponding to a physiological parameter and a baseline value corresponding to the physiological parameter. The access control platform 105 may determine, for example, if the absolute value of the difference is greater than a threshold. In one or more examples, more than one threshold value may be used. The access control platform 105 may, for example, determine if the absolute value of the difference is greater than a first threshold, greater than a second threshold, greater than a third threshold, or the like. In an example, the first threshold is lower than the second threshold, and the second threshold is lower than a third threshold. The access control platform 105 may determine one or more of the first threshold, the second threshold, and/or the third threshold based on the baseline value corresponding to the physiological parameter and/or a standard deviation corresponding to the physiological parameter. The first threshold, the second threshold, and the third threshold may correspond to, for example, 0.5 SD, SD, and 2 SD, respectively. The access control platform 105 may use, for example, a different number of thresholds (e.g., one, two, four, or the like), and/or different threshold levels.

The access control platform 105 may determine, for example, if a physiological measurement is within a range of values (e.g., as determined in step 212) or outside the range of values. The access control platform 105 may determine, for example, if the physiological measurement is within a first range of values, or within a second range of values, or within a third range of values, and the like. The second range of baseline values may be larger than the first range of baseline values, and the third range of values may be larger than the second range of baseline values. The first range of baseline values $y_{0.5}$, corresponding to the physiological parameter, may defined as $y_{0.5}=(\bar{x}-0.5\ SD,\ \bar{x}+0.5\ SD)$, wherein $\bar{x}$ corresponds to an average value of physiological measurements corresponding to the physiological parameter, and SD represents a standard deviation of the physiological measurements. The second range of baseline values y, corresponding to the physiological parameter, may defined as $y_1=(\bar{x}-SD,\ \bar{x}+SD)$. The third range of baseline values y, corresponding to the physiological parameter, may defined as $y_2=(\bar{x}-2\ SD,\ \bar{x}+2\ SD)$.

The access control platform 105 may, for example, receive a physiological measurement (e.g., a value) from a sensor device. The access control platform 105 may determine, for example, if the value exceeds a first threshold value, exceeds a second threshold value, or exceeds a third threshold value.

The access control platform 105 may use physiological measurements corresponding to multiple physiological parameters. The access control platform 105 may, for example, compare the physiological measurements with baseline values or ranges of baseline values corresponding to the multiple physiological parameters. The access control platform 105 may determine a number of physiological parameters for which corresponding physiological measurements exceed corresponding baseline values.

At step 228, the access control platform 105 may determine access control to be executed on one or more devices (e.g., one or more devices in the computing environment 100). The access control platform 105 may determine that the access control is to be executed based on the comparison performed at step 224.

The access control platform 105 may refrain from executing access control if an absolute value of difference between a physiological measurement corresponding to a physiological parameter and a baseline value corresponding to the physiological parameter is less than a threshold. The access control platform 105 may refrain from executing an access control if a physiological measurement corresponding to a physiological parameter is within a particular range of values. The access control platform 105 may refrain from executing an access control if a physiological measurement is less than a threshold.

Executing access control on one or more devices may correspond to one or more of (i) restricting access to a software application (e.g., a software application operating on a device), (ii) restricting access to a network (e.g., access to the private network 150 and/or the public network 160) from a device, (iii) restricting access to one or more devices (e.g., one or more of the peripheral device(s) 125, the enterprise user computing device 115, or the like), (iv) restricting access to a database (e.g., a database in one or more devices in the computing environment 100) from a device, (v) subjecting outbound traffic, from a device, to additional controls, and the like.

Restricting access to one or more devices (e.g., the peripheral device(s)125) may comprise, for example, restricting transmission of data to the one or more devices (e.g., from the enterprise user computing device 115, or the like), and/or restricting reception of data transmitted by the one or more devices (e.g., at the enterprise user computing device 115, or the like). Subjecting outbound traffic, from a device, to additional controls may comprise, for example, routing at least some outbound data from the device to an administrator computing device (e.g., the access control administrator computing device 120, or the like). Subjecting outbound traffic, from a device, to additional controls may comprise, for example, blocking at a server device (e.g., the network server 145) at least some types of outbound data from the device (e.g., electronic mail data being transmitted to the private network 150 and/or public network 160).

Larger deviation(s) from the baseline value(s) may result in more stringent levels of access control (e.g., more restrictions on a device). The access control platform 105 may, for example, (i) execute a first set of access controls if a difference between a physiological measurement corresponding to a physiological parameter and a baseline value corresponding to the physiological parameter exceeds a first threshold, and (ii) execute a second set of access controls if a difference between the physiological measurement and the baseline value exceeds a second threshold that greater than the first threshold. The access control platform 105 may, for example, (i) restrict access to a software application if a difference between a physiological measurement corresponding to a physiological parameter and a baseline value corresponding to the physiological parameter exceeds a first threshold, and (ii) restrict access to a software application and further restricting access to a network if a difference between the physiological measurement and the baseline value exceeds a second threshold that greater than the first threshold.

The access control platform 105 may, for example, (i) execute a first set of access controls if a physiological measurement corresponding to a physiological parameter exceeds a first threshold, but does not exceed a second threshold that is greater than the first threshold, and (ii) execute a second set of access controls if the physiological measurement exceeds the second threshold. The access control platform 105 may, for example, (i) restrict access to a software application if a physiological measurement corresponding to a physiological parameter exceeds a first threshold, but does not exceed a second threshold that is greater than the first threshold, and (ii) restrict access to a software application and further restricting access to a network if a physiological measurement corresponding to the physiological parameter exceeds the second threshold.

A level of access control may be determined based on a number of physiological parameters for which physiological measurements exceed corresponding baseline values. A larger number may result in more stringent levels of access control (e.g., more restrictions on the enterprise user computing device 115 corresponding to the user, and/or the peripheral device(s) 125). The access control platform 105 may, for example, (i) execute a first set of access controls if physiological measurements exceed baseline values for a first number of physiological parameters, and (ii) execute a second set of access controls if physiological measurements exceed baseline values for a second number of physiological parameters greater than the first number. The access control platform 105 may, for example, (i) restrict access to a software application if physiological measurement(s) exceed a baseline value for one physiological parameter, and (ii) restrict access to a software application and further restricting access to a network if physiological measurements exceed baseline values for two (or more) physiological parameters.

Executing an access control may further comprise executing access control for a defined time period (e.g., ten minutes, one hour, six hours, one day, or the like). A more stringent level of access control may further comprise executing access control for a longer duration of time.

The access control platform 105 may compare physiological measurement(s) with baseline values(s) over multiple (e.g., 10, 20, 100, 1000, or the like) measurement cycles. The access control platform 105 may, for example, compare physiological measurement(s) with baseline values(s) over multiple (e.g., 10, 20, 100, 1000, or the like) measurement cycles, and determine an access control to be executed based on comparisons over the multiple measurement cycles. The access control platform 105 may determine that an access control is to be executed, for example, if physiological measurement(s) exceed baseline value(s) (e.g., baseline value(s) as determined at step 212) for a majority of measurement cycles under consideration.

At step 232, the access control platform 105 may generate one or more messages to execute access control on one or more devices in the computing environment 100. The access control platform 105 may, for example, generate the one or more messages, for example, if the access control platform 105 determines that access control is to be executed on one or more devices. The message may comprise an indication of one or more device(s) in the computing environment 100 (e.g., the enterprise user computing device 115, the peripheral device(s) 125, the network server 145, and/or the like) on which access control is to be executed. The message may comprise an indication corresponding to access control to be executed on the one or more devices (e.g., as determined at step 228).

Figure 2C:
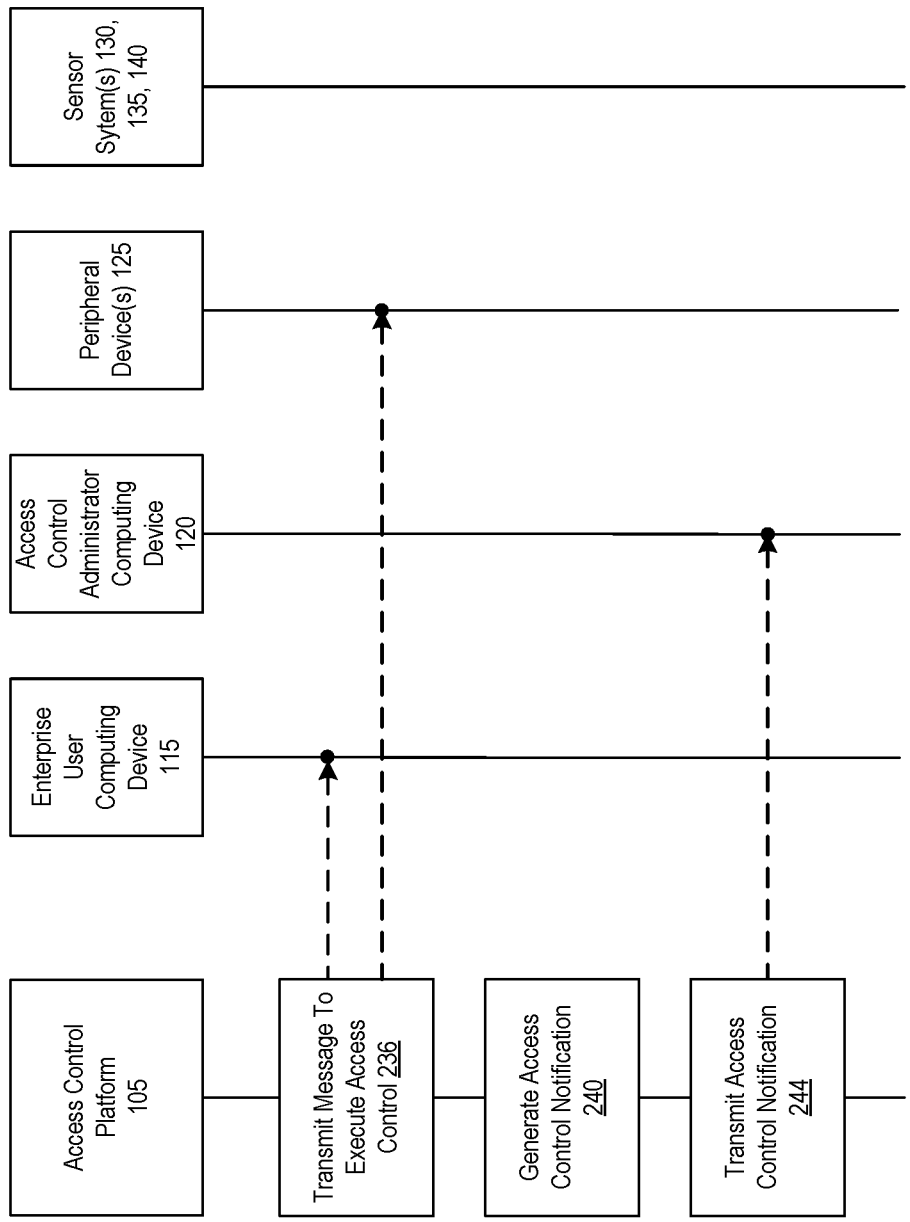

Referring to FIG. 2C, at step 236, the access control platform 105 may transmit one or more messages (e.g., the one or more messages as generated at step 228) to execute access control on one or more devices. The access control platform 105 may transmit the one or more messages to one or more device(s) (e.g., the enterprise user computing device 115, the peripheral device(s) 125, the network server 145, and/or the like). The access control platform 105 may transmit the one or more messages to one or more device(s) that execute access control on one or more other devices.

The access control platform 105 may transmit the one or more messages to, for example, the enterprise user computing device 115 to (i) restrict access to a software application operating on the enterprise user computing device 115, (ii) restrict access to a network (e.g., access to the private network 150 and/or the public network 160, or the like) from the enterprise user computing device 115, (iii) restrict access to a device (e.g., the peripheral device(s) 125, the enterprise user computing device 115, or the like) from the enterprise user computing device 115, (iv) restrict access to a database (e.g., a database in one or more devices in the computing environment 100) from the enterprise user computing device 115, (v) subject outbound traffic, from the enterprise user computing device 115, to additional controls, and the like.

The access control platform 105 may transmit the one or more messages to, for example, the peripheral device(s) 125 to restrict transmission of data from the peripheral device 125 to another device, and/or reception/processing of data from another device. The another communication device may be, for example, the enterprise user computing device 115.

The access control platform 105 may transmit the one or more messages to, for example, the network server 145 to restrict (i) restrict access to a software application (e.g., a software application operating on the network server 145), (ii) restrict access to a network (e.g., access to the private network 150 and/or the public network 160), (iii) restrict access to a device (e.g., the peripheral device(s) 125, the enterprise user computing device 115, or the like), (iv) restrict access to a database (e.g., a database in one or more devices in the computing environment 100) from a device, (v) subject outbound traffic, from a device, to additional controls, (vi) route inbound and/or outbound traffic to/from a user device (e.g., the enterprise user computing device 115 to an administrative device (e.g., the access control administrator computing device 120) and the like.

At step 240, the access control platform 105 may generate an access control notification for transmission to an administrator computing device (e.g., the access control administrator computing device 120, or the like). The access control notification may comprise one or more of (i) an identification of a user (e.g., the user corresponding to the physiological measurement(s) as received at step 220), (ii) an indication of one or more devices corresponding to the user and/or being operated by the user that are subject to access control, (iii) a physiological anomaly detected, (iv) access control restriction(s) as placed on the one or more devices, and the like. The detected physiological anomaly may correspond to, for example, an indication of one or more physiological parameters for which received physiological measurement(s) exceed corresponding baseline value(s). The access control notification may comprise, for example, access control notification data corresponding to a plurality of users. At step 244, the access control platform 105 may transmit the access control notification to an administrator computing device (e.g., the access control administrator computing device 120, or the like).

In an arrangement, the access control platform 105 may combine a plurality of measurements to determine a physiological score. The access control platform 105 may, for example, appropriately scale and/or combine (e.g., using a mathematical expression) a plurality of measurements to determine a physiological score. In an arrangement, the plurality of measurements may correspond to different physiological parameters. In an arrangement, the plurality of measurements may correspond to multiple measurements (e.g., multiple measurements captured at different instances of time) of a physiological parameter. In an arrangement, the plurality of measurements may correspond to multiple measurements (e.g., multiple measurements captured at different instances of time) of multiple physiological parameters.

In an arrangement, physiological scores may be (i) determined based on a plurality of measurements, (ii) used to generate baseline value(s), and/or (iii) used to determine a level of access control. In an arrangement, the access control platform 105 may combine a plurality of physiological scores to generate baseline values. The access control platform 105 may generate physiological models and baseline values using physiological scores, for example, using techniques similar to those described with reference to steps 208 and 212. The access control platform 105 may compare a determined physiological score with baseline value(s) to determine an access control level, for example, using techniques similar to those described with reference to steps 220-228.

FIG. 3 shows an example look-up table 300 for use in providing user monitoring and access control, in accordance with one or more examples. The look-up table 300 is stored, for example, in the access control database 107-2 in the access control platform 105. The look-up table 300 may comprise entries corresponding to one or more of a user identity field 304, a physiological model field 308, a baseline value(s) field 312, an access control settings field 316, a status field 320, and/or the like.

The user identity field 304 may store identification information corresponding to one or more users subject to monitoring and access control. The user identity field 304 may store, for example, codes corresponding to the one or more users. With reference to FIG. 3, for example, "User A" indicates an identity corresponding to a first user, and "User B" indicates an identity corresponding to a second user.

The physiological model field 308 may store model data associated with physiological measurements corresponding to a user. The physiological model field 308 may store, for example, data corresponding to a model generated based on physiological measurements corresponding to a user (e.g., the model as generated at step 208). The baseline value(s) field 312 may store baseline value(s) associated with physiological measurements corresponding to a user. The baseline value(s) may correspond to baseline values as described with reference to step 212. Maintaining separate models and/or baseline values corresponding to individual users enables the access control platform 105 to perform individualized monitoring of specific users, based on physiological measurements corresponding to the specific users. The model data and the baseline value(s), as stored in the physiological model field 308 and/or the baseline value(s) field 312, may be updated regularly (e.g., after every sensor measurement, after every ten sensor measurements, after every hundred sensor measurements, or the like).

The access control settings field 316 may comprise one or more access controls that may be executed based on physiological measurements. The access control settings 316 may comprise, for example, restrictions to be executed based on a comparison between physiological measurement(s) and baseline values. The restrictions may correspond to one or more restrictions as described with reference to step 228. The access control settings 316 may comprise an indication of one or more devices, corresponding to a user and/or being operated by a user, on which access controls are to be executed.

The access control settings 316 may comprise different access control levels to be executed based on deviation(s) from baseline value(s) and/or a number of physiological parameters for which physiological measurements exceed corresponding baseline values. A larger deviation from a baseline value and/or a larger number of physiological parameters for which physiological measurements exceed corresponding baseline values may be associated with a more stringent access control level (e.g., more restrictions on one or more devices).

The status field 320 may comprise access control status corresponding to a user. The status field 320 may comprise, for example, an indication of whether access control restrictions has been executed on one or more devices. The status field 320 may comprise, for example, indications of specific access control restrictions executed on one or more devices. The status field 320 may comprise, for example, indications of one or more devices, on which access control restrictions have been executed. The status field 320 may comprise, for example, data corresponding to results of one or more comparisons between physiological measurements and baseline values (e.g., as determined at step 224).

Figure 4:
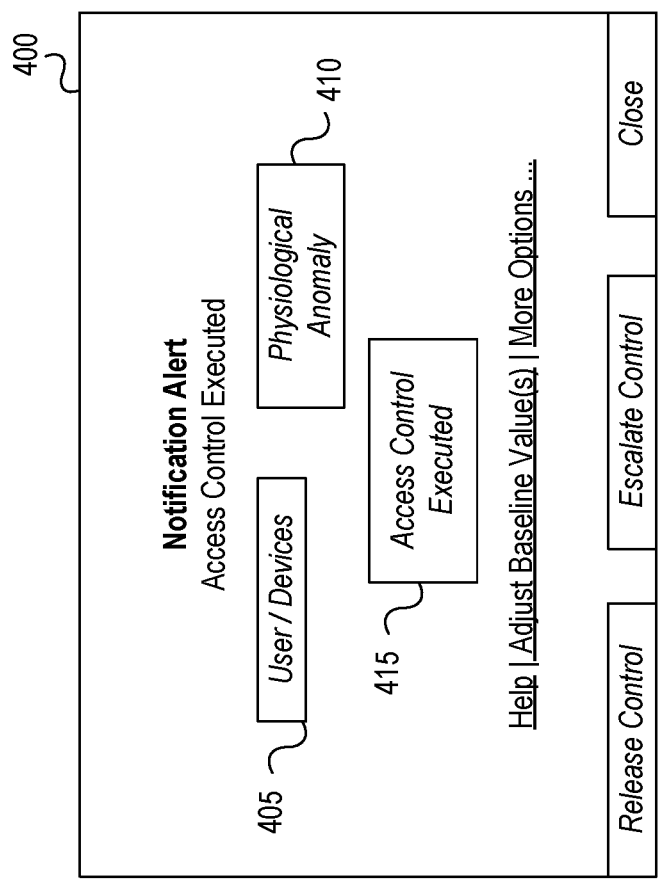
FIG. 4 shows an example graphical user interface corresponding to an access control notification message, in accordance with one or more example embodiments.

FIG. 4 shows an example graphical user interface 400 corresponding to an access control notification message (e.g., as transmitted to an administrator computing device such as the access control administrator computing device 120), in accordance with one or more example arrangements. The graphical user interface 400 may be presented at the access control administrator computing device 120. The graphical user interface 400 may be presented at the access control administrator computing device 120, for example, if the access control administrator computing device 120 receives an access control notification message (e.g., the access control notification as described with reference to step 236) from the access control platform 105. The graphical user interface 400 may be presented in, for example, other devices as described above with reference the computing environment 100.

One or more fields corresponding to the graphical user interface 400 may correspond to data as received in an access control notification and/or as retrieved from the look-up table 300. A user/devices field 405, for example, one or both of (i) an identification of a user, and (ii) an indication of one or more devices corresponding to the user and/or being operated by the user that are subject to access control by the access control platform 105. A physiological anomaly field 410 may correspond to, for example, indication(s) of physiological parameter(s) for which received physiological measurement(s) exceed corresponding baseline value(s). An access control executed field 415 may correspond to access control restrictions executed on one or more devices corresponding to the user and/or being operated by the user. The access control executed field 415 may further comprise an indication of a defined time period (e.g., ten minutes, one hour, six hours, one day, or the like) of which access control restrictions are to be executed. A user of the administrator computing device may use one or more options in the graphical user interface 400 to manually adjust baseline value(s), release an access control that has been executed, or place additional access controls on one or more devices. One or more of the physiological model field 308 and the baseline value(s) field 312 corresponding to a user may be updated, by the access control platform 105, based on a manual update of the baseline value(s) by the user.

Figure 5:
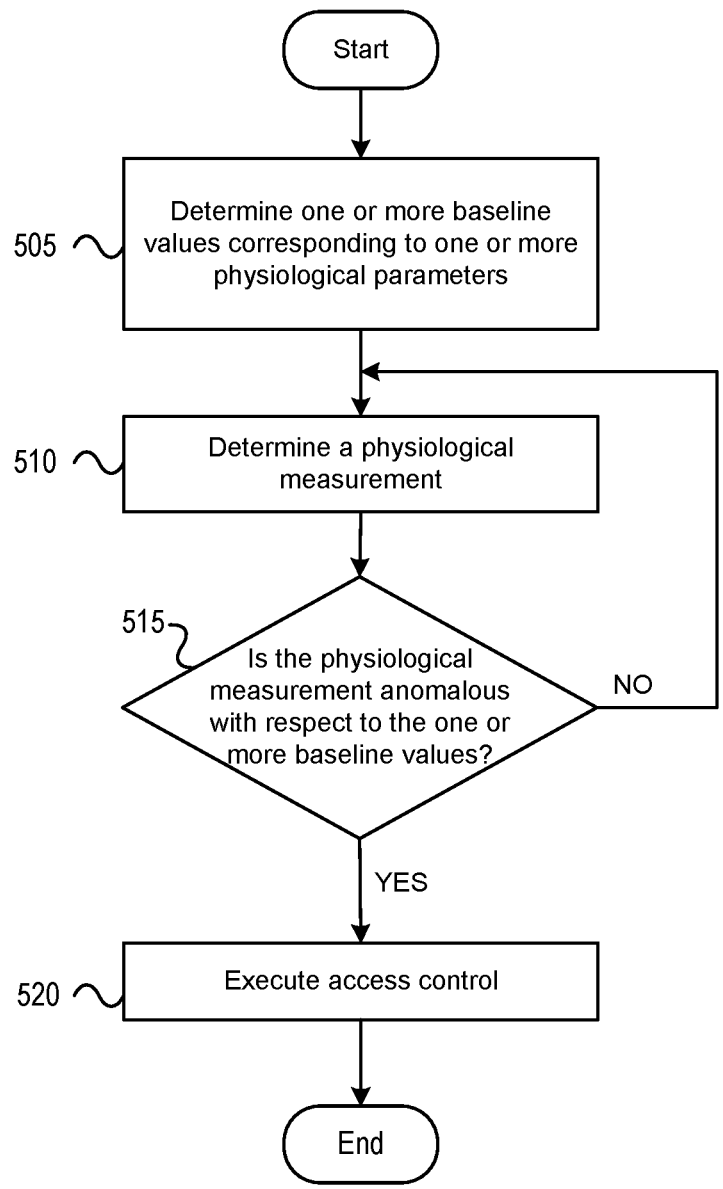
FIG. 5 shows an illustrative method for user monitoring and access control, in accordance with one or more example embodiments.

FIG. 5 shows an illustrative method for user monitoring and access control, in accordance with one or more example arrangements. Referring to FIG. 5, at step 505, a computing platform comprising at least one processor, a communication interface, and memory may determine one or more baseline values corresponding to one or more physiological parameters. The computing platform may determine one or more baseline values based on, for example, techniques described with reference to steps 208 and/or 212.

At step 510, the computing platform may determine, a physiological measurement corresponding to one or more physiological parameters. The physiological measurement may correspond to one or more physiological parameters (e.g., hear rate, skin conductance, or the like). The computing platform may utilize one or more techniques described with reference to step 220 to determine a physiological measurement.

At step 515, the computing platform if the physiological measurement is anomalous with respect to the one or more baseline values. The computing platform may utilize one or more techniques described with reference to step 224 to determine if the physiological measurement is anomalous with respect to the one or more baseline values.

At step 520, the computing platform may, if the physiological measurement is determined to be anomalous with respect to the one or more baseline values, execute access control on a first device. Executing the access control on the first device may comprise generating data, wherein the data comprises an indication of the access control to be executed on the first device. Executing the access control on the first device may further comprise transmitting, via the communication interface, the data to execute the access control on the first device. The computing platform may utilize one or more techniques described above with reference to step 228 and step 232 generate the data corresponding to the access control and transmitting the data to execute the access control. In various arrangements, the computing platform may correspond to the access control platform 105 described above with reference to FIGS. 1A, 1B, 2A, 2B, and 3 or any other device that performs functions corresponding to FIG. 5.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   determine, using a plurality of physiological sensors, a plurality of physiological measurements of a plurality of physiological parameters of a user of a first device;
   determine, based on the plurality of physiological measurements, a quantity of physiological parameters that are anomalous with respect to respective ranges of baseline values; and
   execute access control on the first device, wherein a level of the access control is determined based on the quantity of physiological parameters that are anomalous with respect to respective ranges of baseline values, and wherein executing the access control on the first device comprises transmitting, via the communication interface, data to execute the access control on the first device.

2. The computing platform of claim 1, wherein the memory stores additional computer-readable instructions that, when executed by the at least one processor, cause the computing platform to:
   determine, using a first physiological measurement and a second physiological measurement, a physiological score,
   wherein a physiological parameter being anomalous with respect to a range of baseline values comprises the physiological score being anomalous with respect to the range of baseline values.

3. The computing platform of claim 1, wherein the memory stores additional computer-readable instructions that, when executed by the at least one processor, cause the computing platform to:
   determine, using a physiological sensor, a physiological measurement of a physiological parameter; and
   determine that the physiological parameter is anomalous with respect to a range of baseline values based on the physiological measurement being outside the range of baseline values.

4. The computing platform of claim 1, wherein the data further comprises:
   an identification of the first device; and
   an indication of an access control restriction to be executed on the first device.

5. The computing platform of claim 1, wherein the data to execute the access control is transmitted to the first device.

6. The computing platform of claim 5, wherein executing the access control comprises one or more of:
   restricting operations of a software operating on the first device;
   restricting access, of the first device, to a communication network;
   restricting access, of the first device, to a database;
   restricting access, of the first device, to a peripheral device; and
   implementing additional controls on at least one of: data outbound from the first device, and data inbound to the first device.

7. The computing platform of claim 1, wherein the data to execute access control is transmitted to a second device that is different from the first device.

8. The computing platform of claim 7, wherein executing the access control comprises one or more of:
   restricting access of the first device to transmit data to and/or receive data from the second device;
   restricting access to a software application, operating on the second device, by the first device; and
   restricting access to a database communicatively coupled to the second device, from the first device.

9. The computing platform of claim 1, wherein executing the access control on the first device comprises one of:
   based on the quantity exceeding a first threshold value, but not a second threshold value, executing a first set of access controls; or
   based on the quantity exceeding the second threshold value, executing a second set of access controls.

10. The computing platform of claim 1, wherein the quantity of physiological parameters being anomalous comprises the quantity of physiological parameters being higher than a first threshold value, wherein the memory stores additional computer-readable instructions that, when executed by the at least one processor, cause the computing platform to:
    determine whether the quantity is higher than a second threshold value, wherein the second threshold value is higher than the first threshold value; and
    execute the access control on the first device by causing:
    executing a first set of access controls if the quantity is higher than the first threshold value and not higher than the second threshold value, and
    executing a second set of access controls if the quantity is higher than the second threshold value.

11. The computing platform of claim 1, wherein the memory stores additional computer-readable instructions that, when executed by the at least one processor, cause the computing platform to:
    determine, using the plurality of physiological sensors, a second plurality of physiological measurements;

determine the respective ranges of baseline values based on the second plurality of physiological measurements; and store the respective ranges of baseline values in the memory.

12. The computing platform of claim 1, wherein the plurality of physiological sensors comprises at least one of: a skin conductance sensor, or an image sensor.

13. The computing platform of claim 1, wherein the memory stores additional computer-readable instructions that, when executed by the at least one processor, cause the computing platform to:

generate an access control notification, wherein the access control notification comprises one or more of: an indication of the first device, and the access control executed on the first device; and transmit the access control notification to a second device.

14. The computing platform of claim 1, wherein a range of baseline values is based on a mean value of historical physiological measurements of a physiological parameter and a standard deviation of the historical physiological measurements.

15. A method, at a computing platform comprising at least one processor, a communication interface, and memory, the method comprising:

determining, using a plurality of physiological sensors, a plurality of physiological measurements of a plurality of physiological parameters of a user of a first device;

determining, based on the plurality of physiological measurements, a quantity of physiological parameters that are anomalous with respect to respective ranges of baseline values; and executing access control on the first device, wherein a level of the access control is determined based on the quantity of physiological parameters that are anomalous with respect to respective ranges of baseline values, and wherein executing the access control on the first device comprises transmitting, via the communication interface, data to execute the access control on the first device.

16. The method of claim 15, further comprising:

determining, using a first physiological measurement and a second physiological measurement, a physiological score, wherein a physiological parameter being anomalous with respect to a range of baseline values comprises the physiological score being anomalous with respect to the range of baseline values.

17. The method of claim 15, further comprising:

determining, using a physiological sensor, a physiological measurement of a physiological parameter; and determining that the physiological parameter is anomalous with respect to a range of baseline values based on the physiological measurement being outside the range of baseline values.

18. The method of claim 15, wherein the quantity of physiological parameters being anomalous comprises the quantity of physiological parameters being higher than a first threshold value, the method further comprising:

determining whether the quantity is higher than a second threshold value, wherein the second threshold value is higher than the first threshold value;

wherein the executing access control on the first device comprises:

executing a first set of access controls if the quantity is higher than the first threshold value but not higher than the second threshold value, and executing a second set of access controls if the quantity is higher than the second threshold value.

19. The method of claim 15, further comprising:

generating an access control notification, wherein the access control notification comprises one or more of: an indication of the first device, and the access control executed on the first device; and transmitting the access control notification to a second device.

20. One or more non-transitory computer-readable media storing instructions that, when executed by a computing platform comprising at least one processor, a communication interface, and memory, cause the computing platform to:

determine, using a plurality of physiological sensors, a plurality of physiological measurement of a plurality of physiological parameters of a user of a device;

determine, based on the plurality of physiological measurements, a quantity of physiological parameters that are anomalous with respect to respective ranges of baseline values; and execute access control on the device, wherein a level of the access control is determined based on the quantity of physiological parameters that are anomalous with respect to respective ranges of baseline values, and wherein executing the access control on the device comprises transmitting, via the communication interface, data to execute the access control on the device.

* * * * *